United States Patent [19]

Ahlen

[11] 4,010,660
[45] Mar. 8, 1977

[54] TRANSMISSION INCLUDING A HYDRODYNAMIC TORQUE CONVERTER

[75] Inventor: Karl Gustav Ahlen, Stockholm, Sweden

[73] Assignee: S.R.M. Hydromekanik Aktiebolag, Stockholm-Vallingby, Sweden

[22] Filed: Feb. 12, 1975

[21] Appl. No.: 549,449

[30] Foreign Application Priority Data

Feb. 14, 1974  United Kingdom ............... 6856/74

[52] U.S. Cl. .................................. 74/688; 74/677; 74/730
[51] Int. Cl.² ....................................... F16H 47/08
[58] Field of Search ............ 74/730, 677, 731, 732, 74/733, 688, 718

[56] References Cited

UNITED STATES PATENTS

| | | | |
|---|---|---|---|
| 2,782,658 | 2/1957 | Schaefer et al. | 74/731 X |
| 2,985,036 | 5/1961 | Forster | 74/730 X |
| 3,261,232 | 7/1966 | Ahlen | 74/732 |
| 3,263,524 | 8/1966 | Konrad | 74/677 |
| 3,280,655 | 10/1966 | Jandesek | 74/677 |
| 3,491,621 | 1/1970 | Moan | 74/730 X |

Primary Examiner—Samuel Scott
Assistant Examiner—Lance W. Chandler
Attorney, Agent, or Firm—Larson, Taylor and Hinds

[57] ABSTRACT

A transmission having a double rotation torque converter and including a central assembly in which is mounted both a first brake for securing the torque converter guide ring against rotation and a second brake which cooperates with a planetary gear to cause rotation of the guide ring oppositely from the turbine ring of the torque converter. The two brakes and at least part of the planetary gear are mounted in the central assembly. The guide shaft extending axially from the guide ring is radially journalled in the central assembly. The transmission also includes a fluid communication system which, in cooperation with a pump, controls the mode of operation of the torque converter. The pump and most of the fluid system passageways may also be located within the central assembly. The torque converter may include a releasable torque transmitting member and the transmission may include further gearing stages downstream from the torque converter and the central assembly.

16 Claims, 3 Drawing Figures

TRANSMISSION INCLUDING A HYDRODYNAMIC TORQUE CONVERTER

This invention relates to a transmission including a hydrodynamic torque converter of the type having a rotatable casing and a stationary housing and utilizing a guide vane ring which in one driving range acts as a turbine member for transmitting torque via a gear to a turbine shaft and which, in another driving range, is held stationary to function as a stationary guide vane ring.

Torque converter transmissions of the above type are well known and are used for railway, bus, truck and earth-moving equipment applications, and are normally fully automatic units which also normally include a lock-up clutch. They are known as transmissions of the SRM system and were basically developed by SRM Hydromekanik AB and earlier by Svenska Rotor Maskiner.

A torque converter of the type referred to is normally complicated as regards assembly and normally requires particularly narrow axial tolerances. It has hitherto been necessary to utilize shimming to adjust axial distances and these designs have only allowed the use of a few subgroups.

Further, exchange or replacement of accessories such as co-operating gears is not easily achieved.

It is an object of this invention to provide a transmission which is assembled mainly from a number of subgroups and completely or nearly completely avoids the use of shimming. It is another object of the invention to provide a transmission wherein there are no valves, or elements of the automatic or remote control thereof other than brake or coupling servo motors, which are not accessible from outside the transmission, and wherein larger eccentricities and misalignments between guiding surfaces are permissible which considerably simplifies manufacture, assembly, mounting of accessories and mounting the transmission on a prime mover, for example, an internal combustion engine. Further, loss of oil by leakage is reduced by as far as possible by, for instance, avoiding an outside pipeing and by avoiding as far as possible the use of cast pressurized chambers having surfaces on the outside of the wet part of the main casing.

According to the present invention there is provided a transmission including a hydrodynamic torque converter of the type having a rotatable casing and a stationary housing and utilizing a guide vane ring which in one driving range acts as a turbine member for transmitting torque via a gear to a turbine shaft and which, in another driving range, is held stationary to function as a stationary guide vane ring, characterized by a central assembly of associated components mounted in the stationary housing and comprising a central stationary member, at least one servo brake, at least parts of one planetary gear, and fluid communication means principally disposed within the central stationary member for conveying fluid to and from a control valve system accessible from the outside of the stationary housing.

The axial positioning of the torque converter itself is achieved through the guide vane shaft and axial journalling of the parts in the blade system are preferably independent of radial journalling so that the parts of the torque converter are journalled relative to each other for axial thrust. Preferably, also, the transmission includes a two-shaft feeder fluid gear pump positioned in the lower part of the central stationary member and having a heat exchanger, when used, mounted in or attached to the sump part of the stationary housing. In order to reduce leakage loss of fluid from the transmission at least the rotatable casing is composed of steel sheet stampings as opposed to cast components which, not infrequently, are porous or contain flaws and consequently leakage occurs.

The invention will now be described by way of example with reference to the accompanying drawings, in which:

FIG. 1 is a longitudinal section of a transmission in accordance with the invention and including a torque converter of the type referred to;

Figure 1:
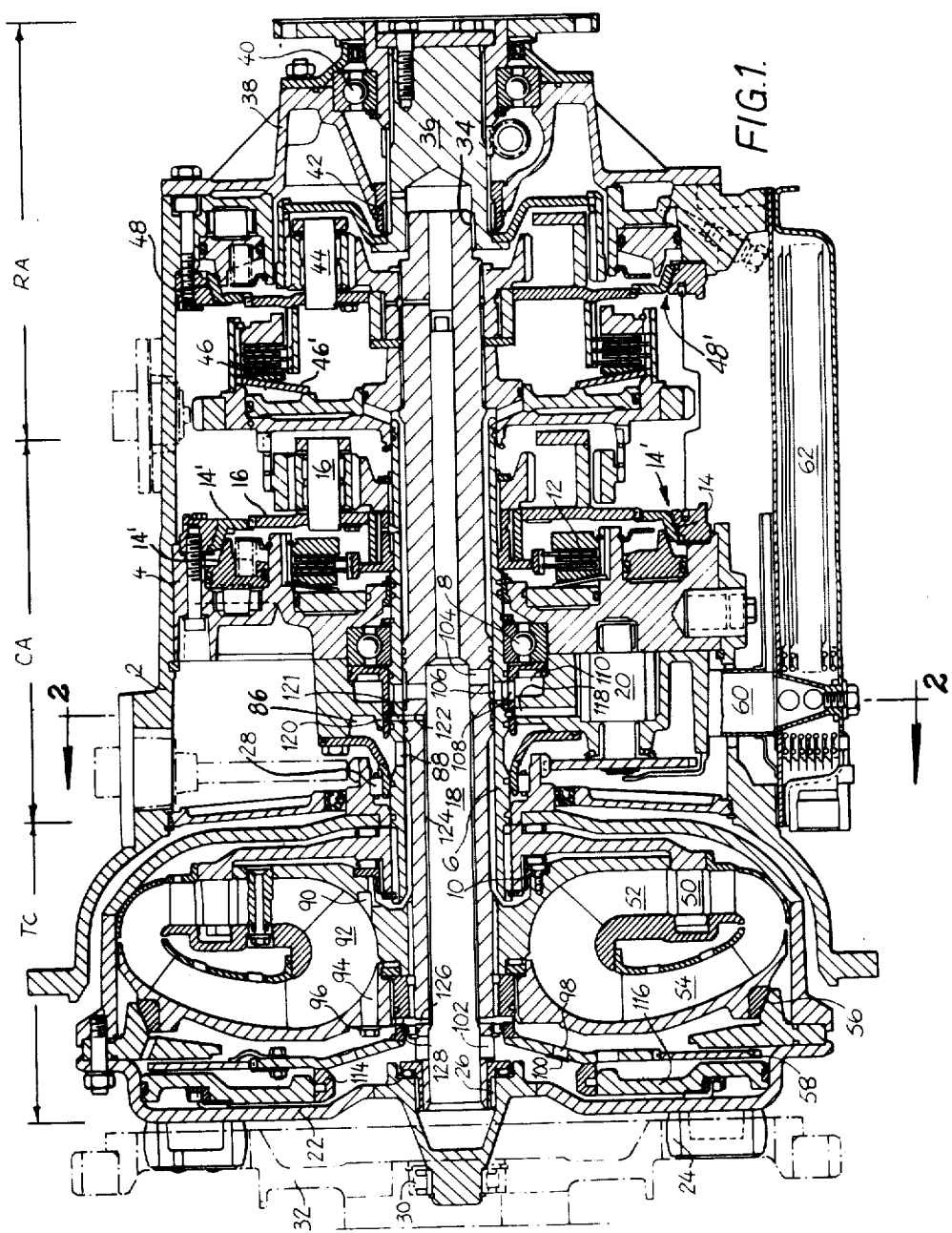

The transmission of FIG. 1 may be regarded as an assembly of three main parts, namely, a torque converter TC of the type having a rotatable casing 22, a central assembly CA of operatively associated components and a rear assembly RA of operatively associated components.

The associated components of the central assembly CA are carried in a stationary member 4 which is mounted in a stationary housing 2 and through which the torque converter guide vane shaft 6 extends and is journalled in a bearing 8.

The central stationary member 4 also carries a guide vane shaft brake 12 and a planet gear carrier 16 for a planet gear interposed between the guide vane shaft 6 and a turbine shaft 18, and a brake 14 for the planet gear carrier 16, said brake 14 having double conical engaging surfaces 14'.

A feeder fluid gear pump 20 comprises two externally meshing gears 21,23 (FIG. 2) of which one is driven through a gear on the rotatable casing 22 directly from a flywheel 32 through rubber cushions 24.

The turbine shaft 18 is journalled in the rotatable casing 22 through a plain bearing 26. The rotatable casing 22 is, at its rear end, journalled in the central stationary member 4 in a radial bearing 28 and at its front end in the flywheel 32 through a bearing 30. The turbine shaft 18 is, at its rear end, journalled through a plain bearing 34 in an output shaft 36 which, in turn, is journalled in a rear cover 38 by a ball bearing 40 and a radial bearing 42.

Between the turbine shaft 18 and the output shaft 36 there is a reverse planet gear arrangement having a planet gear carrier 44 giving a direct connection between the shafts 18 and 36 when a brake 46 is engaged and reversing the direction of rotation of the output shaft 36 when a brake 48 is engaged and the clutch 46 is released. Brake 48 comprises double conical surfaces 48'. A Belleville spring 46' urges the discs of brake 46 to a released condition.

In the rotatable casing 22, a guide vane ring 50 is mounted on the guide vane shaft 6 and on the turbine shaft 18 a turbine member 52 is mounted. The rotatable casing 22 also contains a pump member 54, connectable or releasable from the rotatable casing through a clutch 56. A lock-up clutch arrangement 58 is also included for connecting the turbine shaft 18 directly to the rotatable casing 22.

Figure 2:
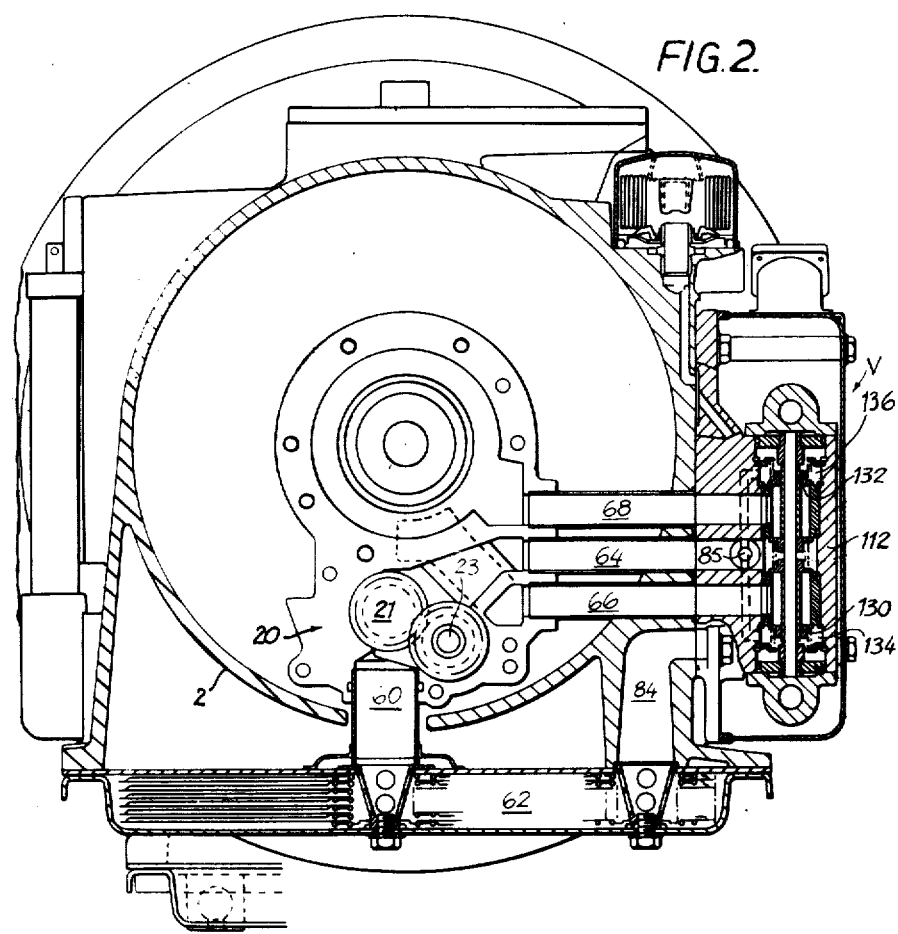
FIG. 2 is a cross-section of the torque converter shown in FIG. 1 through its central assembly taken along line 2—2 of FIG. 1.

FIG. 2 shows a cross-section of the torque converter of FIG. 1 through the central assembly CA and together with FIG. 1 illustrates how the feeder fluid pump 20 delivers pressure fluid to a valve system V, mounted on the outside of the converter stationary housing 2, through a pressure fluid supply pipe 64 and two pipe connections 66 and 68, alternatively connectable by a valve 112 to the pressure fluid supply pipe 64, the remaining pipe of the pipes 66 and 68 returning the flow of fluid after its passage through the torque converter blade system. This figure also shows in the stationary housing 2 a return pipe 84 from the valve system to a heat exchanger 62 and a pipe connection 60 from the outlet side of the heat exchanger to the gear pump 20. The path of fluid flow from the pipe 66 to the pipe 68 through the torque converter passes through the central assembly CA (FIG. 1) to a chamber 86, through holes 88, through spaces between the shafts 6 and 18 and through holes 90 to a working chamber 92 and the blade rings 50, 52 and 54, and thence through the holes 94 and associated maximum pressure valves 96, through a hole 98 and a one way valve 100, through a hole 102, through a central hole or bore 19 in the turbine shaft 18 and through the holes 104, 106 and 108 back to a chamber 110 in the central assembly CA, in which the pipe 66 is connected to the chamber 86 and the pipe 68 is connected to the chamber 110.

The flow of fluid passes along the path described when the torque converter is in hydraulic drive. In FIG. 2 the valve 112 is in a position to connect the pipe 64 to neither the pipe 66 or the pipe 68. In this condition of hydraulic drive, the pump member 54 is connected to the rotatable casing 22 by the clutch 56 through the force produced by the difference in fluid pressure across the maximum pressure valve 96. In direct drive the flow of fluid is principally reversed between the pipes 66 and 68 in such a way that pressure fluid enters through the pipe 68, the valve 112 being set to connect the pipe 64 to the pipe 68. However, instead of passing through the one way valve 100 the pressure fluid enters through the hole 102, proceeds through the maximum pressure valve 114 and, due to the pressure drop, it then acts on the servo piston 116, closing the clutch 58. The fluid after passing through the maximum pressure valve 114 then passes between the braking surfaces of the clutch 56, releasing the pump member 54 and leaving the working chamber 92 through the hole 90, and thence back along the flow path described above to the pipe 66 and to the valve 112. In both cases the returned fluid passes through the valve 112 and back through the duct 84 in the main casing 2, to the heat exchanger, through the heat exchanger and back to the feeder fluid pump 20.

The cross-section shown in FIG. 2, passes through the longitudinal axis of the valve 112 which has, as described, the function of connecting the pressure oil pipe 64 to one or other of two pipes 66, 68 and to connect the one pipe not so connected to the pressure pipe through a vent hole 85.

The valve 112 also has a third position in which the pressure pipe 64 is connected neither to the pipe 66 nor the pipe 68. The pressure pipe 64 is then vented directly to the heat exchanger via opening 85 and then through a maximum pressure valve not shown. However, referring to FIG. 1, there is shown a channel 118 connecting the feeder fluid pump 20 through holes 120, 121 and 122, through a passage 124 formed in the turbine shaft, and other holes 126 and 128 also in the turbine shaft to the working chamber 92. The fluid entering through these holes and passages, being of a restricted quantity, will leave the working chamber 92 through the one way valve 100, which acts at the same time as a low pressure difference maximum pressure valve, passing through the pipe 68 and through a low pressure difference maximum pressure valve 132 (FIG. 2). A corresponding maximum pressure valve 130 is designed for a relatively high opening pressure to ensure that the fluid pressure in the working chamber 92 is suitable for hydraulic braking. This valve 130 will, when the transmission is in the neutral position, be closed. The spaces 134 and 136 in the valve 112 communicate with the pipe 84 in the stationary housing 2.

The valve 112 is constructed so that all parts, viz. valves, valve stems and valve seats are co-axially arranged, the valves being arranged for axial displacement to open, and when forced against their respective seats, they close.

Figure 3:
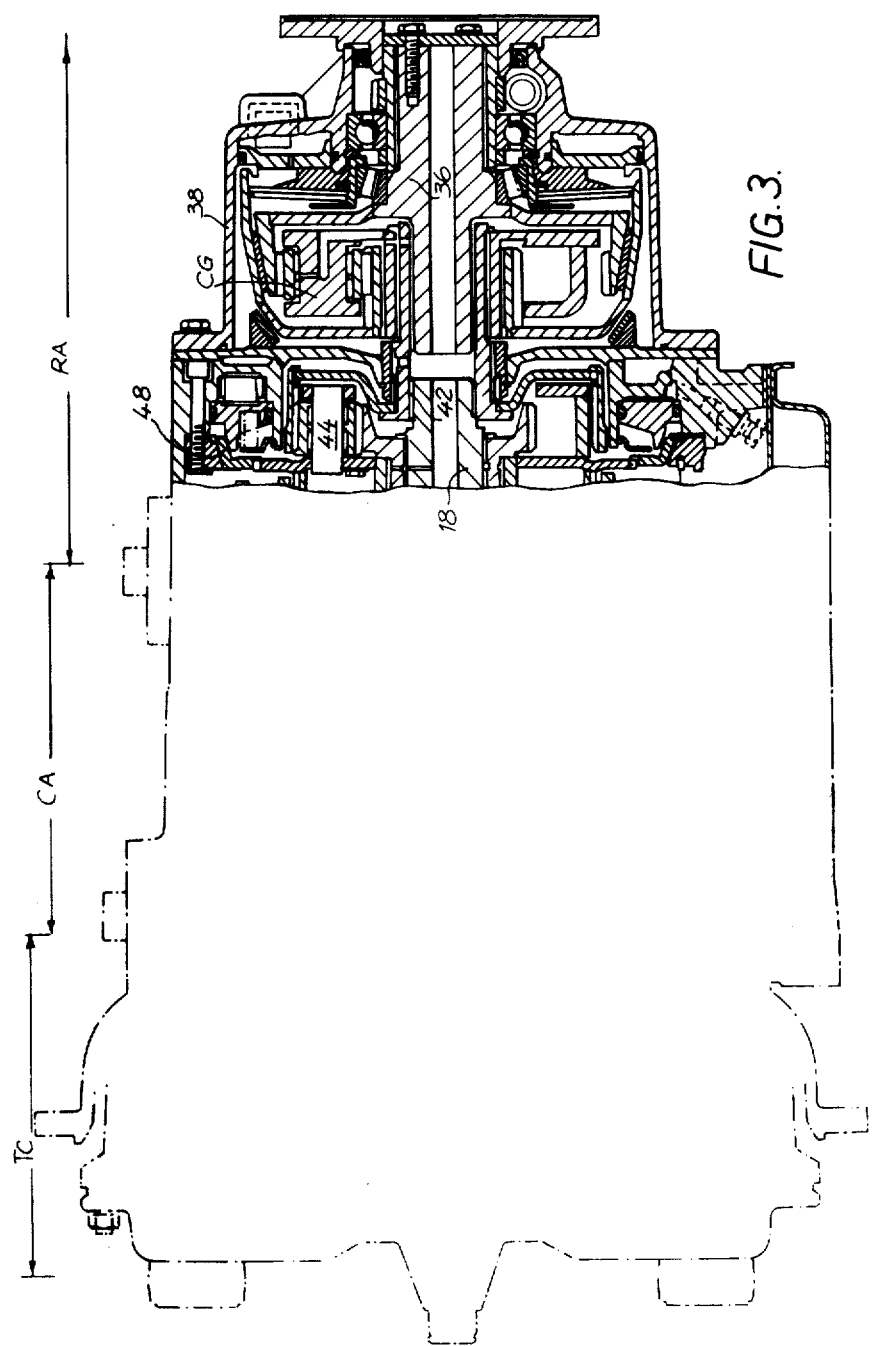
FIG. 3 is a longitudinal section of the transmission of FIG. 1 fitted with a complementary gear.

FIG. 3 shows how with the transmission according to the invention, the rear cover of FIG. 1, without further changes to the operative parts, is replaced by a complementary gear, for instance, an overdrive or an underdrive gear having different gear ratios. This means that the structure of the transmission according to the invention, in addition to the features already described, also has the possibility of being readily adapted to the use of different complementary gears, so that different speed ranges of the complementary gears can be used under all driving conditions in normal forward drive.

What we claim is:

1. A transmission comprising:
    a stationary housing,
    a torque converter having a rotatable casing forming therein a working chamber which includes therein at least one ring of pump blades adapted to be driven by the rotatable casing, at least one ring of guide blades, and at least one ring of turbine blades, turbine shaft adapted to be drivingly engaged by the ring of turbine blades,
    a guide ring shaft extending axially from said guide ring, a brake operatively engagable with said guide ring shaft for holding the guide ring fixed with respect to said stationary housing,
    a central assembly block surrounding said guide ring shaft and secured to the stationary housing, said brake being mounted in said central assembly block,
    and journal means which comprises the major radial journal of the guide ring shaft, and hence also of the guide ring, constituted by a journal bearing which journals the guide ring shaft in the central assembly block, said journal means also including means for axially journalling the guide vane shaft in the central assembly block, and including axial thrust bearings between the guide ring and the other said bladed rings of the torque converter.

2. A transmission according to claim 1, including a planetary gear means for operatively connecting said guide ring shaft with the turbine shaft so that the guide ring acts as a turbine member for transmitting torque via said planetary gear to said turbine shaft, a second brake for securing said planetary gear in position for said transmission of torque therethrough, and wherein the second brake is also mounted in the said central assembly block.

3. A transmission according to claim 2, wherein at least a portion of said planetary gear is also mounted in the central assembly block.

4. A transmission according to claim 2, including a control valve for controlling the flow of fluid to the working chamber to control the mode of operation of the torque converter, said control valve attached to the exterior of said central assembly block.

5. A transmission according to claim 4, including a fluid communication system for transporting fluid to and from said working chamber, said fluid communication system including said control valve and comprising a plurality of passageways, which passageways are disposed principally within the central assembly block.

6. A transmission according to claim 5, said fluid communication system including a pump mounted within said central assembly block.

7. A transmission according to claim 6, said torque converter including means operable in response to fluid within the fluid communication system for selectively engaging or releasing at least one of its ring of said pump blades or said ring of turbine blades with respect to the rotating casing or the turbine shaft, respectively.

8. A transmission according to claim 2, said stationary housing enclosing an oil containing part of the transmission, said central assembly block being located within the said oil containing part.

9. A transmission according to claim 2, said planetary gear means including a planet carrier mounted in the central assembly block, said second brake including means for securing the planet carrier fixed with respect to the stationary housing for the guide ring to act as a turbine member.

10. A transmission according to claim 2, said stationary housing enclosing an oil containing part of the transmission, said central assembly block being located within the said oil containing part, and including a feeder fluid gear pump comprising two externally meshing gears mounted within the central assembly block within the fluid containing part of the transmission, and means for driving said pump from the rotatable casing of the torque converter.

11. A transmission according to claim 10, including a heat exchanger located beneath the central assembly block within the oil containing part of the transmission and in fluid communication with said pump.

12. A transmission according to claim 2, said first and second brakes including servo cylinders to operate each, the pistons of the servo members being slidable within the central assembly block.

13. A transmission according to claim 2, including a further planetary gear for selecting forward or reverse drive of the transmission, said further planetary gear located between the central assembly block and the end of the stationary housing remote from the torque converter, a third brake for engaging reverse gear and a fourth brake disposed between the turbine shaft and the carrier of the said planetary gear, the operation of the third brake serving to fix the further planetary gear carrier and establish a connection between the turbine shaft and the output shaft through the planetary gear for reverse drive and operation of the fourth brake serving to establish direct forward drive through the further planetary gear.

14. A transmission according to claim 3, wherein the said third brake is positioned towards the end of the stationary housing remote from the torque converter.

15. A transmission according to claim 3, in which the fourth brake for direct forward drive through the further planet gear is of the disc type, and wherein engagement of the fourth brake is effected against a plate spring of the Belleville spring type acting to retard movement of a servo motor piston of the fourth brake into a released condition when not energized and to multiply the engaging force acting in the said servo motor piston when the servo motor is energized.

16. A transmission according to claim 2, wherein the first and third brakes are of the double conical type.

* * * * *